United States Patent [19]
Seron

[11] 3,874,776
[45] Apr. 1, 1975

[54] RETAINER FOR EYEGLASSES
[75] Inventor: Suren V. Seron, Joliet, Ill.
[73] Assignee: Seron Manufacturing Company, Joilet, Ill.
[22] Filed: Apr. 26, 1973
[21] Appl. No.: 354,528

[52] U.S. Cl................. 351/123, 2/14 V, 351/156
[51] Int. Cl............................................. G02c 5/00
[58] Field of Search .......... 351/118, 123, 155, 156, 351/157; 2/14 V

[56] References Cited
UNITED STATES PATENTS

| 1,894,888 | 1/1933 | Ponton............................ 351/157 X |
| 2,808,632 | 10/1957 | Cline................................ 351/157 X |
| 2,819,650 | 1/1958 | Seron.................................. 351/156 |
| 2,835,945 | 5/1958 | Hilsinger........................ 351/157 X |
| 3,288,547 | 11/1966 | Klinger et al. .................. 351/123 X |

OTHER PUBLICATIONS
Optical J. & Review of Optom., Vol. XCV, Issue 11, p. 76, June 1958.

Primary Examiner—Paul A. Sacher
Attorney, Agent, or Firm—Wegner, Stellman, McCord, Wiles & Wood

[57] ABSTRACT

An inexpensive retainer for eyeglasses or the like. The retainer is fabricated from a strap of flexible material, preferably in the form of a tube, which partially receives a ring of flexible material, preferably a plastic O-ring. A ferrule is crimped about the end of the strap in such a way that a large loop of the ring is exterior of both the ferrule and the tube to receive the temple of an eyeglass or the like.

5 Claims, 2 Drawing Figures

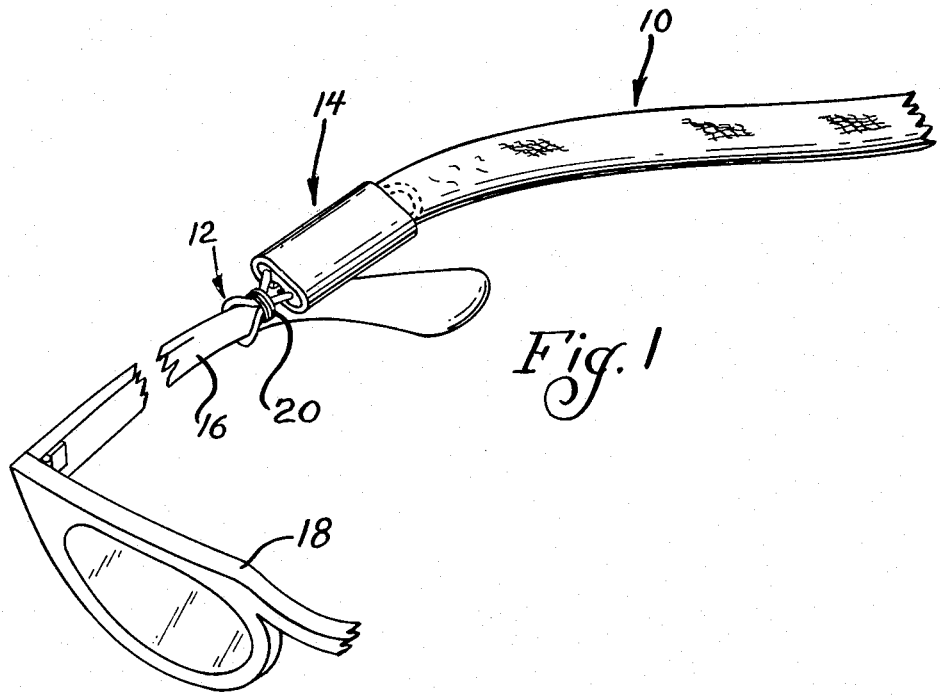
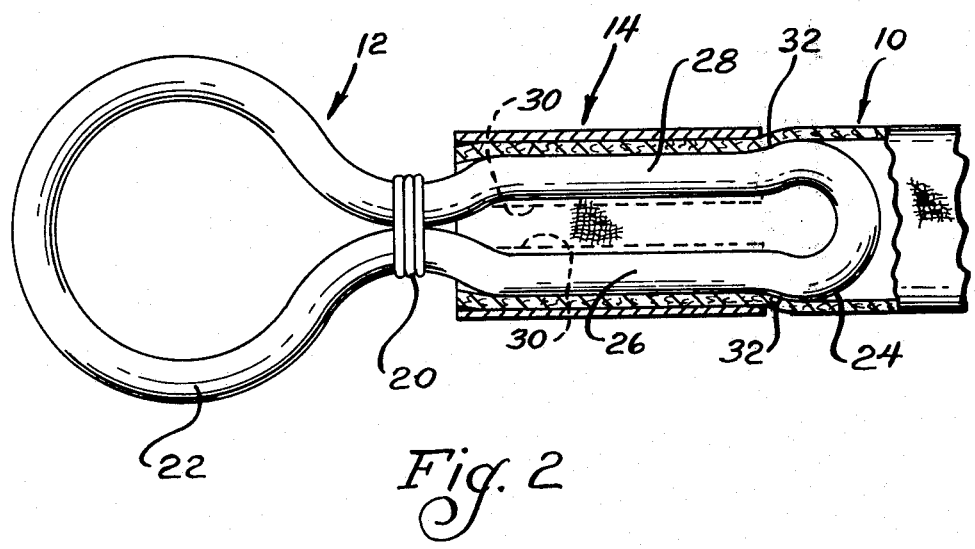

RETAINER FOR EYEGLASSES

BACKGROUND OF THE INVENTION

This invention relates to retaining device and, more particularly, to retainers for eyeglasses.

Eyeglass retainers of varying types have been used by persons requiring the use of eyeglasses in a variety of different endeavors. Frequently, athletes will employ eyeglass retainers of the type including a strap that fits relatively tightly about the head so as to hold the eyeglasses firmly affixed to the wearer so that they will not become dislodged during physical exertion.

Other users of eyeglasses have employed retainers for other purposes. For example, frequently a person who does not require continual use of their eyeglasses will employ a retainer that is relatively loose so that when the eyeglasses are not needed, the same may be removed and allowed to hang by the retainers on the wearer's chest.

Frequently, eyeglass retainers of both types have been relatively expensive to fabricate for any of a variety of reasons.

SUMMARY OF THE INVENTION

It is the principal object of the invention to provide a new and improved eyeglass retainer. More specifically, it is an object of the invention to provide an eyeglass retainer that may be inexpensively fabricated with no specially fabricated parts, employing principally shelf items.

The exemplary embodiment of the invention achieves the foregoing object through a construction including an elongated, flexible strap. According to the preferred embodiment, the strap is formed as a tube of fabric-like material, plastic, etc.

A ring formed of a resilient material is also employed. Preferably, the ring is a conventional O-ring formed of plastic.

A last principal component, an ordinary ferrule, is crimped about a portion of the O-ring and the end of the flexible strap to hold the two in assembled relationship. That portion of the O-ring exterior of the strap and the ferrule defines a retaining means which may receive the temple of an eyeglass or the like. Typically, the O-rings and crimps will be applied to both ends of the strap if a strap is to be employed as an eyeglass retainer, although for other retaining purposes, it may only be necessary to provide those components at one end of the strap.

According to the preferred embodiment, the O-ring is partially received within the tube-like strap and the ferrule applied about the same so that two loops are formed, both exterior of opposite ends of the ferrule. One loop is a relatively large loop which serves as the retaining means as aforesaid, while the other loop is a relatively small loop and has a diameter greater than the distance between the opposite sides of the O-ring within the ferrule to provide a bulging formation which assists in maintaining the retainer in assembled relationship.

In some instances, a large loop size adjusting means may be provided. According to a preferred embodiment, the adjusting means is in the form of a collar located about the large loop and slidable thereon so as to selectively decrease or increase the periphery thereof.

Other objects and advantages of the invention will become apparent from the following specification taken in conjunction with the accompanying drawings.

DESCRIPTION OF THE DRAWINGS

FIG. 1 is a perspective view of one end of a retainer made according to the invention and fastened to the temple of an eyeglass; and FIG. 2 is a sectional view of a portion of the retainer.

DESCRIPTION OF THE PREFERRED EMBODIMENT

An exemplary embodiment of a retainer made according to the invention is illustrated in FIGS. 1 and 2, and with reference thereto, is seen to include three basic components.

The first is a flexible strap, generally designated 10, which preferably is in the form of a tube. The same may be formed out of fabric or out of plastic tubing as desired.

A second component is a ring, generally designated 12, which is formed of a resilient material. According to a preferred embodiment of the invention, the ring 12 is an easily obtainable O-ring formed of any suitable plastic material, including rubber.

The third principal component is a ferrule, generally designated 14, which is crimped about both the tube 10 and the ring 12 to hold the two in assembled relation. Of course, it will be recognized that if the retaining means of the invention is to be used as an eyeglass retainer, the ring 12 and the ferrule 14 will be provided at both ends of the strap 10 so that by securing the ends of the strap to respective temples of an eyeglass, a retaining loop will be defined. Of course, if desired, loop size adjusting means such as buckles can be arranged in a conventional way on the strap 10 so that its length may be selectively adjusted.

As best seen in FIG. 1, a portion of the ring 12 extends from the ferrule 14 to define a loop which may be fitted about the temple 16 of a pair of eyeglasses 18. If desired, loop size adjusting means can be provided. As illustrated in the drawings, loop size adjusting means are in the form of a collar 20 which may be formed of wire or any other suitable material including rubber. The collar 20 is movable on the ring 12 so that the perimeter of the same can be adjusted as necessary, to achieve a tight fit on the means to be retained. In many instances, the collar 20 may be omitted simply by forming the loop of the ring 12 extending from the ferrule 14 sufficiently small while making the ring 12 of a sufficiently resilient material so that is may be expanded to receive the object to be retained whereupon the natural resilient of the material forming the ring 12 will cause the same of contract to tightly embrace the object to be retained.

Referring now specifically to FIG. 2, interrelationship of the strap 10, the ring 12 and the ferrule 14 will be explained in greater detail.

As can be seen, the O-ring defining the ring 12 is distorted out of its original O-shape to define a large loop 22 as generally alluded to previously, and a small loop 24. Intermediate the loops 22 and 24, the opposite sides 26 and 28 of the O-ring are received in the tube defining the strap 10 and crimped in such location by the crimp 14 which may merely be a piece of metal having free ends 30. Preferably, the arrangement is such that the distance between the opposite sides 26 and 28, which are generally parallel within the crimp 14, is less than the diameter of the small loop 24 which emerges from the ferrule 14 through one side thereof but, nonetheless, is within the tube defining the strap 10. In essence, a bulge 32 in the plane defined by the ring 12, is then formed adjacent the end of the ferrule 14 at the point of emergence of the small loop 24 which assists in retaining the ring 12 in assembled relation with the strap 10 and the ferrule 14. The presence of the bulge 32 is highly desirable whether or not a tube-like strap 10 is employed. from the foregoing it will be appreciated that a retainer made according to the invention can be simply and easily fabricated with a minimum of construction expense and employing inexpensive starting materials. Ferrules such as the ferrule 14, are standard items in many industries, while the rings 12, if purchased as inexpensive O-rings, are readily available from a variety of manufacturers. And, of course, the strap 10, whether or not in tubular form, is easily acquired.

I claim:

1. An eyeglass retainer, comprising
 an elongated, flexible strap;
 a continuous ring formed of resilient material; and
 a ferrule crimped about an end of said strap and opposite sides of said ring such that a large loop and a small loop of the ring emerge from the ferrule, the opposite sides of the ring within the ferrule being generally parallel and the diameter of said small loop being greater than the distance between said parallel opposite sides to assist in maintaining said retainer in assembled relation, and said large loop being adapted to receive the temple of an eyeglass.

2. A retainer according to claim 1 wherein said strap is defined by a tube, the portion of said ring received in said ferrule and said small loop being received in said tube.

3. A retainer according to claim 1 further including large loop size adjusting means including a collar about said large loop and movable thereon.

4. A retainer according to claim 1 wherein said ring is an O-ring formed of a plastic material.

5. A retainer comprising
 an elongated, flexible strap formed as a tube;
 an O-ring formed of resilient, plastic material partially received in an end of said tube;
 a ferrule crimped about said end of said tube such that said O-ring has a first portion within said tube and exterior of one end of said ferrule defining a small loop of a diameter greater than the distance between opposite sides of the O-ring within the ferrule, and a second portion defining a large loop exterior of said tube and the other end of said ferrule and defining a retaining means for receipt of an object to be retained.

* * * * *